United States Patent [19]

Lhomme

[11] 3,827,823
[45] Aug. 6, 1974

[54] CUTTING TOOL ADJUSTMENT DEVICES

[75] Inventor: François G. Lhomme, Billancourt, France

[73] Assignees: Regie Nationale Des Usines Renault, Billancourt; Automobiles Peugeot, Paris, both of, France

[22] Filed: Jan. 22, 1973

[21] Appl. No.: 325,344

[30] Foreign Application Priority Data

Jan. 28, 1972  France....................... 72.02908

[52] U.S. Cl.................................... 408/158, 29/96
[51] Int. Cl..... B23b 29/034, B26d 1/12, B23q 3/00
[58] Field of Search................. 29/96, 95 R, 105 A; 408/154, 156, 158

[56] References Cited
UNITED STATES PATENTS

| | | | |
|---|---|---|---|
| 2,828,529 | 4/1958 | Bryant | 29/96 |
| 3,391,585 | 7/1968 | Griswold et al. | 408/158 |
| 3,530,745 | 9/1970 | Millewski | 408/158 |
| 3,740,161 | 6/1973 | Milewski | 408/158 |

Primary Examiner—Harrison L. Hinson
Attorney, Agent, or Firm—Stevens, Davis, Miller & Mosher

[57] ABSTRACT

This device for adjusting through a moderate range of positions each tool insert of a multiple-tool assembly under the control of a pusher comprises a pressure member consisting of a ramp formed in a piston and responsive to the expansion of a member in which an electric heating resistance is embedded. In the specific case of a bore machining bar comprising a plurality of insert tools, the tool carriers are disposed in cavities communicating with an axial hole of the bar enclosing the piston, the expansion member and its resistance, all the lead-in wires of the various resistances being sealed in longitudinal external grooves formed on the surface of said bar.

7 Claims, 3 Drawing Figures

PATENTED AUG 6 1974 3,827,823

CUTTING TOOL ADJUSTMENT DEVICES

The present invention relates to cutting tool adjustment devices and has specific reference to an adjustable cutting-tool wedging device, notably for multiple tools comprising inserts of the type employed in milling tools or bore-machining bars, for low-amplitude movements such as wear compensation or clearing backing movements for compensating elastic deformation during the operation of a machine.

Devices of this character are already known through the French Pat. Nos. 69/06,469, 69/13,016, 69/13,017 and 69/12,443 in these devices the moderate movements required are caused by an elastic deformation of the tool carrier under the control of reduction means comprising levers, differential screws, gear reduction mechanisms, controlled in turn by hydraulic, pneumatic or electro-mechanical means.

Although these various systems are advantageous on account of their high degree of precision, they are generally cumbersome and relatively expensive.

It is the essential object of the present invention to provide a device for adjusting through a small range of movement cutting tools carried by flexible resilient supports and responsive to the action of a pressure exerted by a pusher, this device being characterised in that said pressure is obtained through the expansion of a pressure member inserted in the tool-holder body and heated through internal electric heating means.

Preferably, said pressure is obtained through the medium of mechanical reduction means. More particularly, the pusher is controlled by means of a frustoconical ramp formed in the body of a piston reacting with one end against elastic means and bearing with its opposite end against the relevant face of a cylinder of electrically insulating expansible material having an electric resistance embedded therein. A stacking comprising resilient means, said piston, said expansible body and the abutment element of the expansible body receiving the connecting means of said electric resistance, may thus be enclosed in a common hole formed in said tool holder body.

The operation of this device is obtained by causing electric current to flow through said embedded resistance, so as to expand said expansible material and push said piston against its elastic means. The movement of the frustoconical ramp of said piston ensures a predetermined wedging of said pusher and therefore of the tool itself. Varying the electric current intensity will thus permit of controlling the forward or backward movement of the tool.

This device is advantageous on account of its low cost, moderate overall dimensions and substantial flexibility in actual use.

The reduced over-all dimensions of the device make it particularly suitable for controlling the tools of bore machining bars; a typical example of this specific application of the invention will now be described with reference to the attached drawing, in which.

Figure 1:
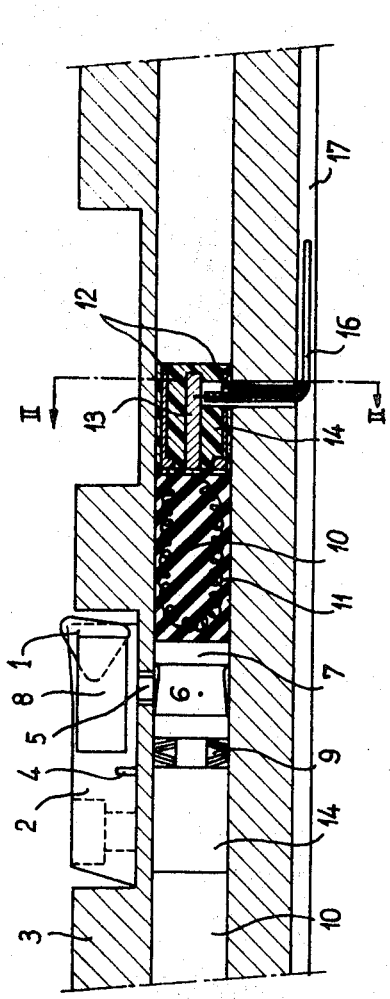
FIG. 1 is a fragmentary axial section showing a bore-machining bar element.
Figure 3:
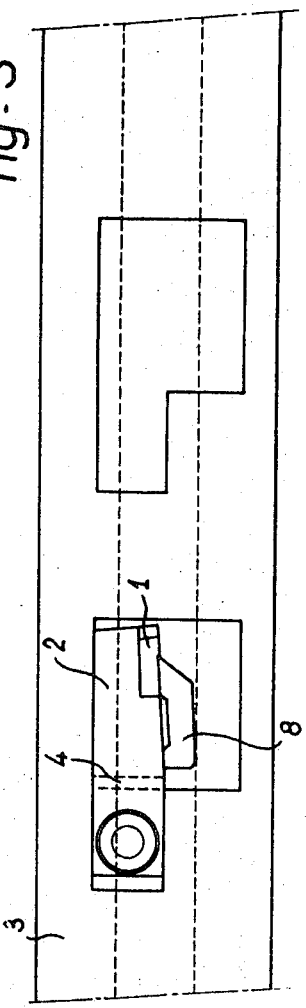
FIG. 3 is a plane view from above of the element shown in FIG. 1, to illustrate the mounting of the tool according to a known system.

Referring first to FIG. 1, the tool insert 1 is mounted in an elongated tool carrier 2 of a known commercial type, screwed in a cavity of the bore machining bar 3 and comprising a notch 4 permitting the flexion of this carrier 2 under the control of a pusher 5. The tool insert 1 is clamped to the carrier 2 by means of a bridge piece 8.

Figure 2:
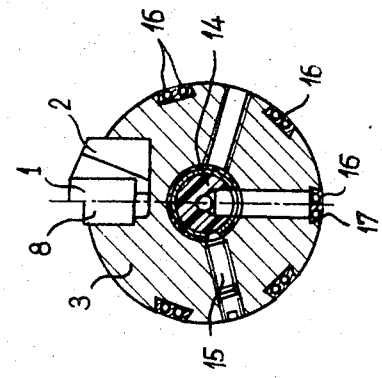
FIG. 2 is a cross-section taken along the line II—II of FIG. 1.

The aforesaid pusher 5 engages the frustoconical surface 6 of a piston 7 reacting with one face against a spring 9 and engaging with the opposite face a piece 10 of expansible synthetic material in which an electric heating resistance 11 is embedded, the terminals 12 and 13 of this resistance being also embedded in an insulating abutment member 14 held against translation by a set screw 15 (FIG. 2).

The terminals 12 and 13 are connected to current lead-ins 16 sealed in external longitudinal grooves 17 formed along said bar.

As already explained in the foregoing, during the machining operation the variation in the current flowing through the heating resistance 11 permits of controlling at will the forward and backward movements of the tool. More particularly, the expansion of piece 10, under the influence of a temperature increment caused by said heating resistance 11, will drive the piston 7 against the spring 9, thus causing the frustoconical portion 6 to recede and retracting the pusher 6 and therefore the tool 1, this possibility being taken advantage of before withdrawing the bore machining bar, upon completion of the machining operation.

In contrast thereto, by gradually decreasing the heating current according to a predetermined programme, the tool 1 may be fed gradually forwards to compensate its wear.

It is also possible, by reversing the direction of inclination of the tapered postion 6, to feed the tool 1 as the heating increases.

Although this solution is advantageous on account of a greater safety (due to the withdrawal of the tool in case of failure in the electric mains) it is objectionable in that it requires the production of additional heat for compensating the increased heat losses, which is detrimental to the precision and adds undesired complications to the control means, whereas in the reverse direction corresponding to the present example it was found that the curve corresponding to the tool wear and the curve corresponding to the tool feed obtained by progressively reducing the heating intensity had similar patterns, thus facilitating greatly the calibration of the wear compensating correction.

Although the invention has been described with specific reference to a single form of embodiment of the tool adjusting device as illustrated in the accompanying drawing, it will readily occur to those skilled in the art that various modifications and changes may be brought thereto without departing from the scope of the invention as set forth in the appended claims.

What is claimed as new is:

1. Device for adjusting the moderate displacements of cutting tools supported on a tool carrier comprising resilient flexible holding means engaging the cutting tool, piston pushing means adapted to displace said holding means, and an expansible pressure member of synthetic material inserted in the body of the tool carrier having internal electric heating means, said pressure member being in engagement with said piston pushing means whereby said pressure member expands upon heating and provides for the displacement of the cutting tool.

2. Device according to claim 1, wherein said piston pushing means displacing said holding means comprises a mechanical reduction means.

3. Device according to claim 2, wherein said mechanical reduction means comprises a piston formed with a frustroconical ramp, a resilient means urging said piston against said pressure member and a tool pusher engaging said ramp at one end and said tool holding means at the other.

4. Device according to claim 1, wherein said pressure member is a cylinder of expansible and electrically insulating synthetic material and said internal electric heating means comprises a heating resistance element embedded in said pressure member.

5. Device according to claim 4, wherein said electric resistance element has its connecting terminals embedded in an abutment member of electrically insulating material engaged by said pressure member and from which emerge the lead-in wires of said heating resistance.

6. Device according to claim 3, wherein said pressure member is a cylinder of expansible and electrically insulating synthetic material; said internal heating means comprises a heating resistance element embedded in said pressure member; said electric resistance element has its connecting terminals embedded in an abutment member of electrically insulating material engaged by said pressure member and from which emerge the lead-in wires of said heating resistance; and said resilient means, said piston, said pressure member and said abutment member are stacked in a same cylindrical hole formed in said tool carrier body, and that said tool pusher projects into said hole while engaging said frustoconical ramp of said piston.

7. Device according to claim 6, wherein said device is fitted in an axial hole formed in a bore machining bar at the level of each tool to be controlled, the current lead-ins being sealed in peripheral axial grooves formed in the outer surface of said bar.

* * * * *